United States Patent [19]
Johnson et al.

[11] Patent Number: 4,697,646
[45] Date of Patent: Oct. 6, 1987

[54] DEEP TILLAGE SWEEP

[75] Inventors: William M. Johnson, Winchlesea; Ilmar Mere, St. Marys, both of Australia

[73] Assignee: Ralph McKay Limited, Maidstone, Australia

[21] Appl. No.: 716,622

[22] Filed: Mar. 27, 1985

[30] Foreign Application Priority Data

Mar. 30, 1984 [AU] Australia .............................. PG4343

[51] Int. Cl.$^4$ ....................... A01B 35/20; A01B 39/20
[52] U.S. Cl. .................................... 172/730; 172/771
[58] Field of Search ............... 172/371, 720, 721, 724, 172/730, 749, 750, 753, 762, 763, 771; 403/263, 361; 15/145; D15/11, 28, 29; D34/24, 32

[56] References Cited

U.S. PATENT DOCUMENTS

Re. 6,887   2/1876   Haiman ............................... 172/730
585,613     6/1897   Zeise ..................................... 15/145 X

FOREIGN PATENT DOCUMENTS 106027  12/1938  Australia ............................ 172/762
31248   7/1981   European Pat. Off. ............ 172/749

Primary Examiner—Richard T. Stouffer
Attorney, Agent, or Firm—Christel, Bean & Linihan

[57] ABSTRACT

An earth engaging implement comprising an earth engaging portion located forwardly and below an integral socket portion which socket is tapered in cross-section from its top toward its junction with the earth engaging portion and includes strengthening adjacent the upper end of the socket. The socket is formed by a single piece of metal formed into a partial socket with opposing flanges defining the near face of said socket. The flanges may be closely spaced or if the tine is wide the flanges will be arranged to encompass the edges of the base of the tine. The strengthening may be an increase in the thickness of the flanges and the adjacent portion of the socket located in the top portion of the socket. Preferably, a rib is formed in the flanges just below the top portion of the socket.

3 Claims, 14 Drawing Figures

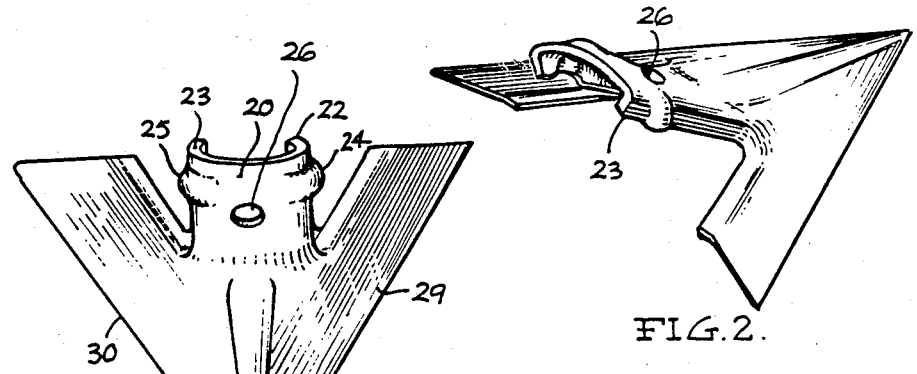
FIG. 1.    FIG. 2.
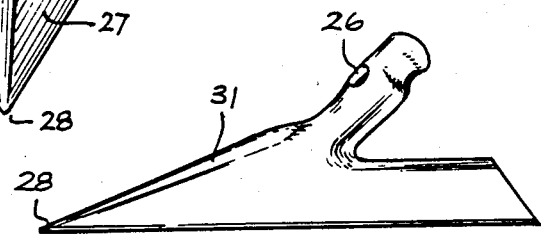
FIG. 3.
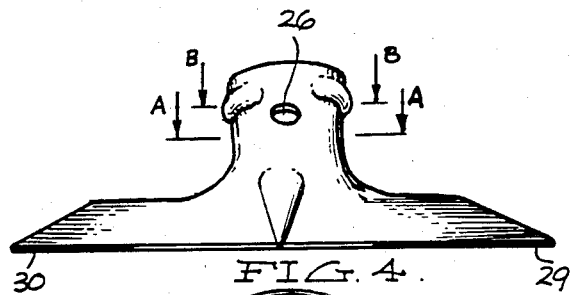
FIG. 4.
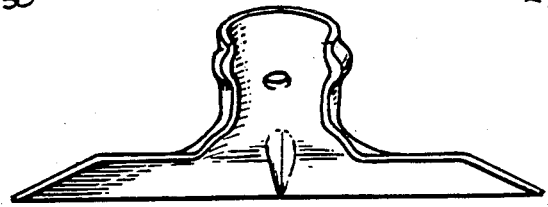
FIG. 5.
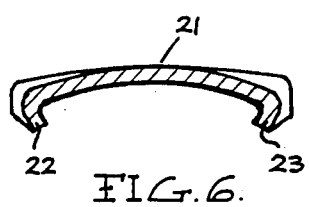     
FIG. 6.    FIG. 7.

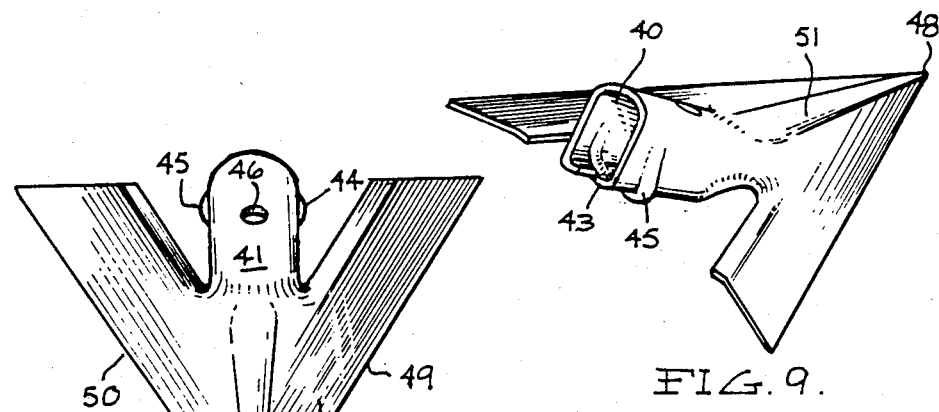
FIG. 9.
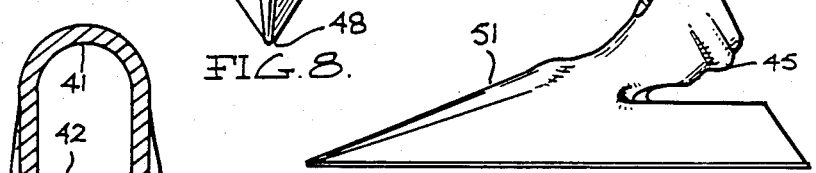
FIG. 8. FIG. 10.
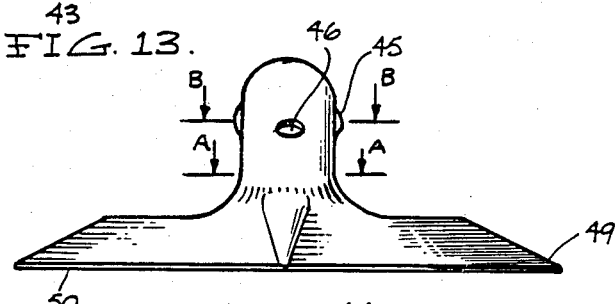
FIG. 13. FIG. 11.
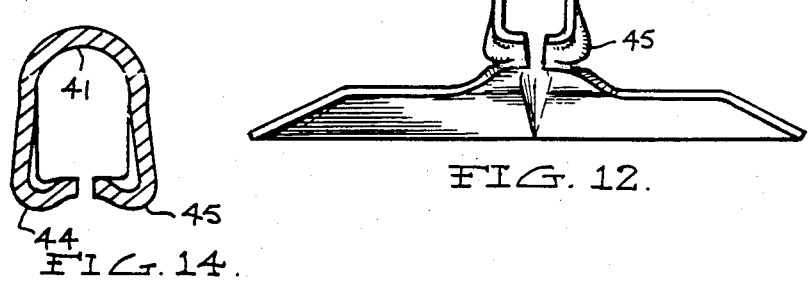
FIG. 12.
FIG. 14.

DEEP TILLAGE SWEEP

This invention relates to an agricultural implement particularly one for use as a deep tillage implement.

Australian Pat. No. 106,027 (Marlow) discloses an implement having a tapered socket adapted to receive the base of a tine of an agricultural machine. This arrangement does away with the need for bolt fastenings as the implement is held on by a wedging frictional grip. Generally, in shallow tillage, the forces applied to the implement simply maintain the socket firmly wedged onto the foot of the tine. However, with deeper tillage, the forces applicable to the upper front portion of the working surface of the implement tend to create a bending moment which applies an equal force tending to open the folded portions of the socket with the result that the sockets grip on the base of the tine is loosened.

It is an object of this invention to overcome this problem.

To this end, the present invention provides an earth engaging implement comprising an earth engaging portion located forwardly and below an integral socket portion which socket is tapered in cross-section from its top toward its junction with the earth engaging portion and includes strengthening adjacent the upper end of said socket.

Preferably the socket is formed by a single piece of metal formed into a partial socket with opposing flanges defining the near face of said socket. Conveniently, the flanges may be closely spaced or if the tine is wide the flanges will simply be arranged to encompass the edges of the base of the tine. The strengthening may be an increase in the thickness of the flanges and the adjacent portion of the socket located in the top portion of the socket. Preferably, a rib is formed in the flanges just below the top portion of the socket.

The sweep of FIGS. 1 to 7 comprises a socket portion 20 and an earth engaging portion 27.

Socket 20 comprises the leading face 21 bounded at each side by rearwardly facing flanges 22 and 23. Located on flanges 22 and 23 below the upper edge of socket 20 are two reinforcing ribs 24 and 25 respectively. The ribs 24 and 25 are formed by indenting the flanges 22 and 23 and the junction of those flanges with face 21 at a point as close to the open end of the socket portion as possible.

The hole 26 is used to tie groups of sweeps together for storage and transport.

The earth engaging portion 27 of the sweep of FIG. 1 comprises a point 28 with two leading edges 29 and 30 sweeping back from point 28 to terminate rearwardly of socket 20. To assist in soil flow over the earth engaging portion and to maintain point 28 from the effects of wear, a dart like indentation 31 is provided.

FIGS. 8 to 14 illustrate a sweep in which the earth engaging portion 47 is similar to the earth engaging portion 27 of the sweep of FIGS. 1 to 7 in that the point 48 leading edges 49 and 50 and the dart 51 are identical to features 28 to 31 of FIGS. 1 to 8.

The socket 40 of FIGS. 8 to 14 is of narrow forward profile comprising a U-shaped body 41 having flanges 42 and 43 at the rear thereof tending to form socket 40 into a tube. Ribs 44 and 45 are located on flanges 42 and 43 and extend into the junction of those flanges with body 41. These ribs are formed by indentation of the flanges 44 and 45 as close as possible to the open end of the socket 40. The hole 46 is used to tie groups of sweeps together for storage and transport.

Usually the end of a tine is shaped to interfit into the sockets 20 or 40 of the sweeps. However, where conventional bolt on tines are used an adaptor may be bolted to the tine to provide a complementary tapered insert for the socket.

In deep tillage, large forces are applied towards the points 28 and 48 of the sweeps and this applies an equally large force on the flanges 22 and 23 and 42 and 43 at the upper ends of sockets 20 and 40. By the provision of the ribs 24 and 25 and 44 and 45 the resistance to the bending of these flanges is increased. The sweeps of this invention are therefore capable of being used in deep tillage operations with a higher operational life.

The claims defining the invention are claimed as follows:

1. An earth engaging implement comprising an earth engaging portion located forwardly and below a socket, which socket is tapered in cross section from its top toward its junction with the earth engaging portion, said socket having an opening at its top and down its length said socket comprising a face and a pair of opposing flanges extending from said face with one of said flanges bounding each side of said face and forming a junction therewith, said socket having at least two reinforcing ribs with one of said ribs in each of said flanges in the upper region of said socket and extending toward the junction of each of said flanges with said face, said ribs being located relative to the opening of said socket such that said ribs are adjacent the greatest curvature in the cross section of the socket to increase resistance to bending of said flanges by forces applied to said earth engaging portion.

2. An earth engaging implement as claimed in claim 1 wherein the socket is formed by folding a blank to a shape which is adapted to conform the socket to the shape of a tapered foot of a tine of an agricultural machine to which the implement is adapted to fit and folding the edges of the socket inwardly to adapt the socket to encompass the side edges of said tine foot and said ribs being incorporated in the region of the folded edges in the upper portion of said socket.

3. An implement as claimed in claim 2 wherein the socket is formed with triangular cross section facing in the forward direction of travel of said implement and each of said ribs being located in the corresponding fold at the two base corners of said triangular cross section.

* * * * *